J. H. ELWARD,

Assignor to St. Paul Harvester Works.

HARVESTER.

No. 9,856. Reissued Sept. 6, 1881.

*Witnesses:*

J. S. Barker.

L. H. Marshall.

*Inventor:*

John H. Elward by Doubleday & Bliss atty's

N. PETERS, Photo-Lithographer, Washington, D. C.

UNITED STATES PATENT OFFICE.

JOHN H. ELWARD, OF STILLWATER, ASSIGNOR TO ST. PAUL HARVESTER WORKS, OF ST. PAUL, MINNESOTA.

HARVESTER.

SPECIFICATION forming part of Reissued Letters Patent No. 9,856, dated September 6, 1881.

Original No. 127,324, dated May 28, 1872. Reissue No. 6,403, dated April 27, 1875. Application for reissue filed July 25, 1881.

*To all whom it may concern:*

Be it known that I, JOHN H. ELWARD, formerly of Polo, county of Ogle, State of Illinois, but now of Stillwater, county of Washington, State of Minnesota, have invented certain new and useful Improvements in Harvesting-Machines, of which the following is a full, clear, and exact description, reference being had to the accompanying drawings, making part of this specification, and in which—

Figure 1:
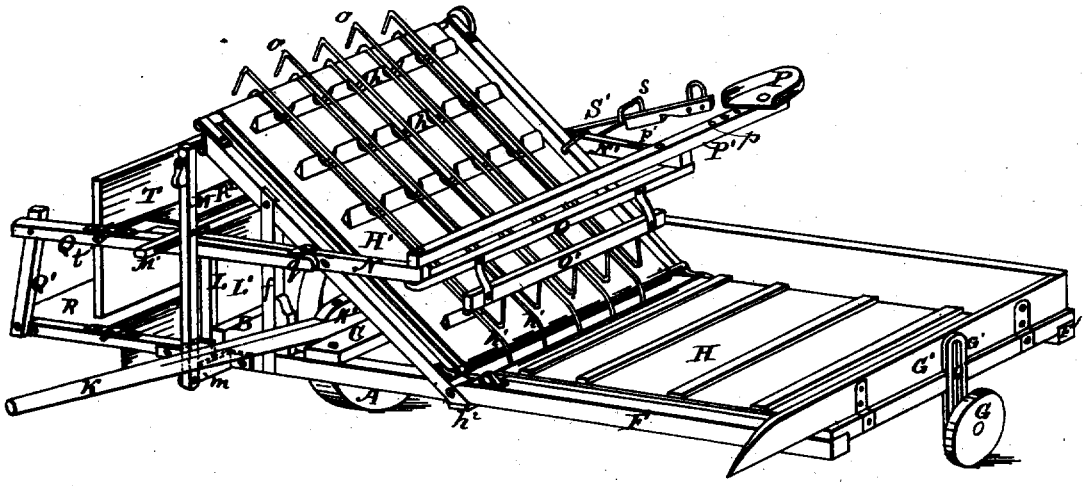
Figure 3:
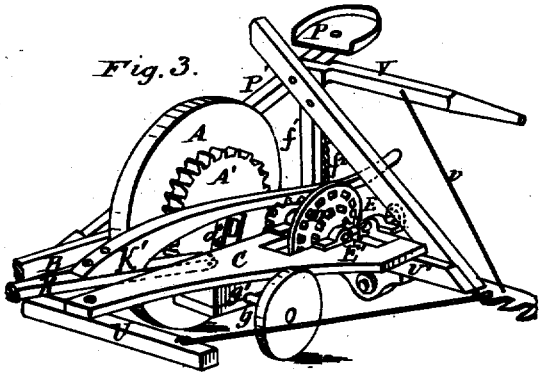
Figure 2:
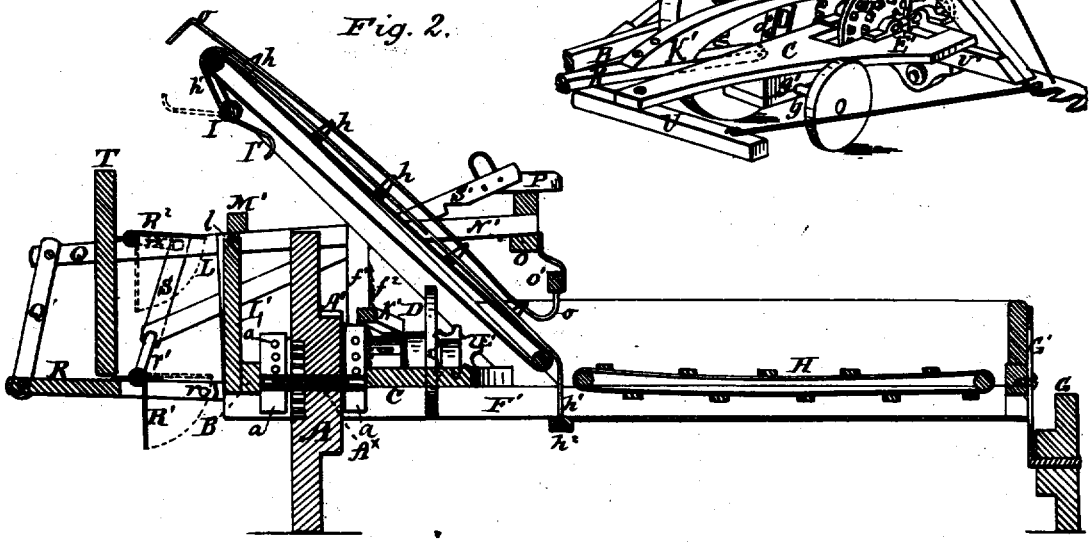

Figure 1 is a perspective view of the machine arranged for reaping. Fig. 2 is a vertical transverse section of the same. Fig. 3 is a perspective view of the mower.

Similar letters of reference denote corresponding parts in all the figures.

The first part of the invention consists in mounting the secondary or bevel-wheel shaft, the crank-shaft, and the support for one end of the main axle of a harvesting-machine upon a removable gear plank or frame in such manner that said gearing and frame may be readily removed from the reaper and combined with a separate mowing attachment.

The second part of the invention consists in making the binders' platform in two parts, one part of which is hinged and may be used as a dropper.

The third part of my invention relates to a novel combination of devices for adjusting the height of the cutting apparatus and the inclination of the carrying-belt, which may be regulated at the will of the operator.

The invention further consists in certain details of construction, as will be hereinafter explained.

In the drawings, A is the main ground drive-wheel, journaled on the axle $A^{\times}$, supported in curved flanges *a*, having holes adapted to receive pins to support the machine at any desired height upon the main axle, substantially as is shown in a patent (No. 113,990) granted to me April 25, 1871, and which need not be particularly described here. One pair of the flanges is mounted upon the longitudinal bar B of the main frame and the other pair upon the gear-plank C. (Shown plainly in Fig. 3.)

D is a driving-wheel mounted upon the secondary or pinion shaft, driven from a spur-gear, A′, attached to the inner face of the ground-wheel A. Wheel D corresponds to the bevel-wheel, which is ordinarily employed in machines of this class; but, instead of having a bevel-gear upon its periphery, it has two or more concentric circles of perforations or sockets cast or cut in its face, with which the teeth or spurs on the periphery of crank-shaft pinion E′ on crank-shaft E engage, the construction and arrangement of these parts being fully shown in Fig. 3. The gear-plank C is in one piece, and is cut out or mortised to permit the gearing to be conveniently mounted thereon, in order that it (the gearing) may be readily transferred from the reaper to the mower, and vice versa.

In the machine as used for a reaper, Figs. 1 and 2, F F′ are the grain-platform sills—one at the front edge and the other at the rear—by means of which the platform is connected with the gearing, and upon which the elevator, reel, and binders' stand are supported.

G is the grain or carrying wheel. When this wheel is applied to the harvester it is mounted upon the adjustable hanger G′; but when the machine is used as a mower it (the wheel) is secured to a short shaft, *g*, which is mounted in a suitable bearing, *g′*, attached to the under side of the gear-plank C.

H is a carrying-belt, arranged behind the cutting apparatus.

H′ is the elevator-belt, provided with transverse knife-edged slats *h*, notched, as shown in Figs. 1 and 2, to receive the wires or rods *h′*, which compress the straw during its passage over the elevator. The rods *h′* are attached at their lower ends to bars $h^2$, extending from sill F to sill F′, and at their upper ends to a roller, I, mounted in suitable bearings on the under side of the elevator-frame in such manner that it can be rotated without disturbing its relation to the rods, for a purpose which will soon be explained.

I′ are fingers projecting at suitable intervals (usually about a foot) from the roller I.

*f f′* are standards or braces rising from sills F F′, to support the rear or upper end of the elevator-frame.

$f^2$ is a ratchet-plate attached to the standard *f′* at the rear side of the machine.

K is the tongue, pivoted to the gear-plank.

K′ is a tilting-lever. One end of this lever is rigidly attached to the tongue a short distance in front of the point at which the tongue is pivoted to the gear-plank, and the other end engages with the ratchet-plate $f^2$. By means of this lever the platform may be tilted upon the main drive-wheel A and the grain or carrying wheel G, as will be readily understood. It will be seen that, in addition to this tilting of the platform on which the grain falls, the main frame of the machine may be supported at different heights on the main drive-wheel and the carrying-wheel G.

L L are posts rising from the stubble ends of sills F F′.

L′ is a grain-guard, serving to prevent the grain from becoming entangled with the main driving-wheel.

M is one of the reel-bearers. The lower end of this bearer is supported upon a bracket, *m*, attached to the main frame, the upper end being supported by a bolt or pin passing through the slotted end of a rail, M′, which, by preference, is made long enough to extend across the machine, and is secured to the posts L or bars attached to said posts. The other reel-bearer is not shown, but may be located at the inner or outer corner of the platform, as it is desired.

N N′ are horizontal bars supported upon the posts L and standards *f f′*, or upon the frame of the elevator.

O is a bar bolted to the overhanging ends of bars N N′.

O′ is a secondary bar suspended from bar O, and provided with a number of elastic guiding compressing-rods, *o*, which are bent and arranged substantially as shown—that is, so as to lie parallel, or nearly so, with the elevator-belt, at a short distance from it, thereby serving to confine the grain to the rods *h′* and the apron, and thus render the operation of said elevator more certain. The upper ends of the rods *o* are bent downward to insure the delivery of the grain upon either the grain-receiver or the dropping devices, which will be explained hereinafter.

P is the seat, and P′ the seat-support. The seat is adjustable upon the support by a bolt, which can be passed through either of a series of holes, *p*, and the support is pivoted to the bar N, and can be adjusted upon the bar N′ by means of bolt-holes *p′*. Thus the weight of the driver can be employed to balance the machine as may be required.

Q Q are hangers, from which the outer side of the binders' stand or platform R is suspended by links Q′ Q′. These hangers are pivoted to the posts L at *l* in such a manner that they can vibrate vertically.

*q* is a stop on bar N, which limits the upward throw of the inner end of the hanger, and there is a similar stop on bar N′.

R is the binders' platform, hinged at its inner side to the main frame, at *r*, and pivoted at its outer edge to links Q′. The floor or platform is made in two parts, the inner part or dropper, R′, being hinged to the outer part, so that it can drop into the position shown in full lines, Fig. 2, when actuated by certain devices, in a manner and for a purpose which will be explained. In practice I prefer to hinge the dropper R′ by means of pivots, and to the rear pivot I attach a crank-arm, *r′*, Fig. 2, in about the relation to the dropper shown in this figure.

$R^2$ is a second dropper, arranged above the dropper R′ and pivoted upon the hangers Q Q. The dropper $R^2$ is also provided with a crank-arm, $r^2$, the position of this arm relative to dropper $R^2$ being the reverse of the crank-arm *r′* relative to the dropper R′.

The crank-arms are connected by means of a link, S, and are operated by a sliding link, S′, which extends past the side of the elevator to within convenient reach of the driver while riding in the seat P. The free end of link S′ rests in a suitable guide, *s*, and is notched upon its lower side, in order that it may be locked in any position in which it may be placed by the driver.

T is a partition board or fender, arranged in a vertical position outside of the droppers. It is secured to the hangers Q Q by pins *t*, or equivalent devices, in such a manner that it may be easily removed. U U′, Fig. 3, are two short sills, which, with bar or sill B and gear-plank C, form the frame of the machine when adapted for mowing.

In Fig. 3 the cutting apparatus is hinged to the main frame, and may be lifted for passing obstruction by means of lever V and link *v*. In this figure the lifting-lever is shown pivoted to one of the inclined side pieces of the elevator; but it is obvious that some other form of support may be employed. In this figure, also, the seat is shown supported on the outer side of the frame, this change being made to balance the machine.

In Figs. 1 and 2 of the drawings the machine is shown as it is intended to be used for a side-delivery dropper, the parts being arranged in the position into which they are moved when delivering a gavel upon the ground, the straw being now received upon the upper dropper, $R^2$. As soon, however, as the gavel is delivered the driver thrusts the link S′ outward—that is, from him—and the two droppers are simultaneously thrown into the position indicated in dotted lines in Fig. 2. By this movement the grain which has accumulated upon the dropper $R^2$ is delivered upon the dropper R′, where it lies until enough has been added to it to make a bundle of the desired size, when the driver draws the link S′ toward him and the gavel is dropped upon the ground, the upper dropper, $R^2$, serving as a cut-off to prevent the grain from straggling while the lower dropper, R′, is open, as will be readily understood.

When I wish to bind the grain as it is cut I remove the fender T and dropper $R^2$ and lock the dropper R′ up in a horizontal position, and, when deemed advisable, I add a box or receptacle for the shattered grain and such rails or other supports for the binders as I may prefer. The roller I is then turned around until the fingers I′ assume the position shown in dotted lines, Fig. 2, thus forming a receiver, in which the grain is deposited from the elevator until enough shall have accumulated to form a bundle, when it is removed and bound.

In order to convert the reaper shown in Figs. 1 and 2 into a mower, as shown in Fig. 3, it is necessary to take the end sill or bar, B, gear-plank C, with the gearing and tongue mounted thereon, and the main drive-wheel A, from their places on the sills F F′ and secure them together by the short sills U U′. Then take the seat P and its support P′ and attach them to the frame (preferably on the outer side, as shown) by a socket or suitable device. Next hinge the cutting apparatus and add the lifting-lever V, link *v*, and a suitable support for them.

In practice I prefer a support which is made on purpose to be used with the mower, instead of taking any part of the reaper, as the expense is but slight, and it is much more convenient. By adding the grain-wheel to the inner side of the gear-plank the mower is ready for operation.

I am aware that reaping-machines have been built in which the gearing, with the exception of the cogged driving-rim on the main carrying-wheel, was mounted upon a single plank piece or frame complete in itself and adapted to be removed from the rest of the frame-work of the machine; but in this construction there was no especial adaptation of the removable parts to fit them for being embodied in a mower, whereas in my machine the construction of the gearing and the gear-frame is such as to facilitate its transfer from a reaper to a mower. Thus the secondary gear is intended to impart two distinct rates of speed to the cutters, and the hangings for the main wheel permit of the gear-frame being supported at different heights, these two features being practically indispensable in a combined machine.

It will, of course, be understood that, as the crank is located at the rear end of the gear-plank, a transmitting-lever must be employed to drive the cutters, which are to be arranged at the front edge of the grain-platform when the machine is reaping. By arranging the seat as shown I use the bars N N′ O for supporting both the seat P and the guiding-rods *o*.

It will be readily seen that as the hangers Q and platform R are pivoted to the frame-work of the harvester and the links Q′ are pivoted to the hangers and the platform, these devices, together with the dropper $R^2$, when it is in position on the machine, can be folded up compactly for passing through gateways and similar contracted places. As the grain passes over the upper end of the elevator H′, the wires *h*′, which are bent into a nearly vertical position, instead of conforming to the path of the elevator-belt, insure the delivery of the grain upon either the grain-receiver or the droppers, and serve to prevent it from clinging to the slats *h*.

Certain features of construction and arrangement hereinbefore described are embraced in another application, and are therefore not here claimed.

I am aware that a carrying belt or apron with transverse slats having projecting spikes or spurs has been used in combination with supporting and guiding wires in this class of machines; but I regard the knife-edged slats used in my machine as being a decided improvement upon the spurs, for the following reasons: As the grain frequently falls in a somewhat-tangled condition upon the platform, it is very desirable to straighten it before it is delivered to the binders. It is difficult, if not impossible, to do this on those elevators in which spurs are employed, because they penetrate the straw, thus keeping it in the same position while it is being elevated, and delivering it to the grain-receiver substantially in a swath, whereas in my construction the slats present as nearly as possible a continuous knife-edge, broken only by narrow notches to receive the wires. As the grain is carried up its progress is retarded by the wires *h*′ and *o*, the greatest pressure being exerted immediately over the slats and wherever there is any accumulation of straw.

It will be apparent that with this construction and arrangement of devices the straw will be pulled apart and divided at each slat, and will be discharged into the receiver in small handfuls, thus greatly facilitating the operation of binding.

Having now described my invention, what I claim as new, and desire to secure by Letters Patent, is—

1. In a harvester, the combination of the following elements, viz: a main frame supporting a grain-carrier in rear of the cutting apparatus, an elevator which elevates the cut grain above the main drive-wheel, a main supporting and driving wheel mounted beneath the elevator in arcs of circles, a pinion mounted concentrically to said arcs and meshing with and vibrating about the main driving-gear, means for supporting the main frame at any desired height upon the main supporting and driving wheel, and means for vibrating and supporting said pinion and the main frame about the shaft of the drive-wheel, substantially as set forth.

2. In a machine for reaping grain, a removable gear and gear-frame, said gearing being adapted to drive the cutters at different velocities, and the gear-frame being constructed substantially as described, so that it can be supported upon the main wheel at different heights, substantially as and for the purpose set forth.

3. The binders' platform constructed of two parts, R R′, hinged to each other, substantially as described, so that one part may be operated as a dropper, substantially as set forth.

4. In combination with the bar I, to which are attached the upper ends of rods *h′*, the fingers I′, whereby said bar I is made to serve both as a support for the rods *h′* and as a head for the rocking grain-receiving fingers, substantially as set forth.

5. The combination, with the broad endless elevating-apron, upon the moving surface of which the grain is carried to the outer or stubble side of the machine, of the knife-edged slats *h*, arranged and operating as described.

6. The combination, with the secondary elevating-apron H′, of the knife-edged slats *h* and the compressing rods or wires *o*, substantially as set forth.

In testimony whereof I affix my signature in presence of two witnesses.

JOHN H. ELWARD.

Witnesses:
H. J. CHAMBERS,
N. S. GOODHUE.